(12) United States Patent
Aibara et al.

(10) Patent No.: US 8,818,286 B2
(45) Date of Patent: Aug. 26, 2014

(54) WIRELESS COMMUNICATION APPARATUS AND WIRELESS COMMUNICATION METHOD FOR DETECTING ELECTRIC FIELD INTENSITY OF WIRELESS CHANNEL

(75) Inventors: Takehiro Aibara, Hamura (JP); Hitoshi Amagai, Fussa (JP); Naotaka Uehara, Higashimurayama (JP); Takayuki Kogane, Akishima (JP); Sumito Shinohara, Akiruno (JP); Masato Nunokawa, Fussa (JP); Tetsuya Handa, Fussa (JP); Kimiyasu Mizuno, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 461 days.

(21) Appl. No.: 12/825,788

(22) Filed: Jun. 29, 2010

(65) Prior Publication Data
US 2010/0330905 A1 Dec. 30, 2010

(30) Foreign Application Priority Data

Jun. 30, 2009 (JP) ................................. 2009-155884

(51) Int. Cl.
*H04B 1/00* (2006.01)
(52) U.S. Cl.
USPC .................... 455/63.3; 455/67.11; 455/67.13; 455/62
(58) Field of Classification Search
CPC ..... H04L 1/0001; H04L 27/2626; H04L 1/20; H04L 5/006; H04L 5/0091; H04L 5/06; H04L 27/2602; H04L 27/3405; H04L 27/02; H04L 27/12; H04L 27/2601; H04L 5/0007; H04L 5/001; H04B 1/1027; H04B 17/0057; H04B 17/0077; H04B 1/005; H04B 1/7163; H04B 1/719; H04B 1/1669; H04B 1/69; H04B 1/713; H04B 1/202; H04B 1/692; H04W 56/001; H04W 72/048; H04W 72/085; H04W 16/10; H04W 28/04; H04W 72/082
USPC ......... 455/41.1–41.3, 77, 428, 440, 441, 423, 455/424, 562.1, 436; 370/318, 282, 321, 370/331, 328, 349, 332, 329, 445, 335, 347
See application file for complete search history.

(56) References Cited

U.S. PATENT DOCUMENTS 5,203,008 A 4/1993 Yasuda et al.
5,404,573 A 4/1995 Yabe et al.
(Continued)

FOREIGN PATENT DOCUMENTS

CN 1302516 A 7/2001
JP 01177223 A * 7/1989 ............... H04B 7/26
(Continued)

OTHER PUBLICATIONS

Chinese Office Action dated Aug. 28, 2012 (and English translation thereof) in counterpart Chinese Application No. 201010220498.4.

(Continued)

*Primary Examiner* — Golam Sorowar
(74) *Attorney, Agent, or Firm* — Holtz Holtz Goodman & Chick PC

(57) ABSTRACT

A wireless communication apparatus includes a communication unit, a detection unit, and a control unit. The communication unit wirelessly communicates with another wireless communication apparatus using a first wireless channel. The detection unit detects electric field intensities of wireless channels except for the first wireless channel. The control unit calculates an electric field intensity of the first wireless channel based on the electric field intensities of the wireless channels detected by the detection unit.

6 Claims, 8 Drawing Sheets

(56) References Cited

U.S. PATENT DOCUMENTS

| | | | |
|---|---|---|---|
| 6,208,861 B1 * | 3/2001 | Suzuki | 455/441 |
| 6,356,746 B1 * | 3/2002 | Katayama | 455/324 |
| 6,529,738 B1 | 3/2003 | Forde et al. | |
| 7,206,606 B2 * | 4/2007 | Kobayashi et al. | 455/562.1 |
| 2006/0035592 A1 | 2/2006 | Park | |
| 2006/0291401 A1 | 12/2006 | Yuen et al. | |
| 2009/0291644 A1 * | 11/2009 | Suwa et al. | 455/77 |

FOREIGN PATENT DOCUMENTS

| | | |
|---|---|---|
| JP | 2002-158667 A | 5/2002 |
| JP | 2003-151062 A | 5/2003 |
| JP | 2004-520766 A | 7/2004 |
| JP | 2005020568 A | 1/2005 |
| JP | 2007-180639 A | 7/2007 |
| JP | 2007-311851 A | 11/2007 |
| JP | 2008-219364 A | 9/2008 |
| JP | 2008-219444 A | 9/2008 |
| JP | 2008-227651 A | 9/2008 |

OTHER PUBLICATIONS

Extended European Search Report dated May 26, 2014 in counterpart European Application No. 10164419.3.

* cited by examiner

WIRELESS COMMUNICATION APPARATUS AND WIRELESS COMMUNICATION METHOD FOR DETECTING ELECTRIC FIELD INTENSITY OF WIRELESS CHANNEL

CROSS-REFERENCE TO RELATED APPLICATIONS

This application is based upon and claims the benefit of priority from prior Japanese Patent Application No. 2009-155884, filed Jun. 30, 2009, the entire contents of which are incorporated herein by reference.

BACKGROUND OF THE INVENTION

1. Field of the Invention

The present invention relates generally to a wireless communication apparatus and a wireless communication method for detecting an electric field intensity of a wireless channel.

2. Description of the Related Art

In recent years, for example, in a wireless communication system specified in, for example, IEEE 802.15.4, a preset wireless frequency band is divided into a plurality of wireless channels in predetermined band widths so as not to overlap each other. Any one of the wireless channels is selected, and wireless communication between ratio communication apparatuses is performed in the selected wireless channel.

In such a wireless communication system, there is a wireless communication apparatus having a function of transmitting/receiving data and a function of detecting the electric field intensity of a wireless channel for transmitting/receiving the data in order to continuously maintain good communication environments.

For example, Jpn. Pat. Appln. KOKAI Publication No. 2003-151062 discloses a wireless apparatus comprising a wireless unit configured to perform data communication, a control unit configured to read reception level output from the wireless unit using two channels of different frequencies, and a storage unit configured to store the read reception level. However, the apparatus has a problem in that the reception level cannot be detected while data is transmitted/received.

To address the problem, there is a wireless communication apparatus comprising two wireless units. One of the wireless units is used for data transmission/reception, and the other wireless unit is used for detecting the electric field intensities plurality of wireless channels in order to find a wireless channel whose communication state is excellent. In such a wireless communication apparatus, while one of the wireless units transmits/receives data, the electric field intensity of the wireless channel used for transmitting/receiving data is detected. Consequently, it becomes unclear whether the detection result of the wireless channel used is a result of detecting the electric field intensity accompanying transmission/reception of data, a result of detecting the electric field intensity of an interference wave, or a result of detection of both of the electric field intensities. That is, there is a problem in that, the electric field intensity for determining the communication state of the wireless channel used cannot be detected.

Further, it is considered that when one of the wireless units and the other wireless unit are synchronized and one of the wireless units is transmitting/receiving data, the electric field intensity of the wireless channel used is not detected. However, the data transmitting/receiving timing occurs at random. Consequently, there are problems in that the electric field intensity of the wireless channel being used cannot be periodically detected, and the detection result cannot be evaluated equivalent to the detection results of the electric field intensities of other wireless channels.

BRIEF SUMMARY OF THE INVENTION

An object of the present invention is to obtain the electric field intensity of a wireless channel used without detecting the electric field intensity of the wireless channel.

According to an embodiment of the present invention, a wireless communication apparatus comprises a communication unit configured to wirelessly communicate with another wireless communication apparatus using a first wireless channel; a detection unit configured to detect electric field intensities of wireless channels except for the first wireless channel; and a control unit configured to calculate an electric field intensity of the first wireless channel based on the electric field intensities of the wireless channels detected by the detection unit.

According to another embodiment of the present invention, a wireless communication method for a wireless communication apparatus comprising a communication unit configured to wirelessly communicate with another wireless communication apparatus using a first wireless channel, the method comprises detecting electric field intensities of wireless channels except for the first wireless channel; and calculating an electric field intensity of the first wireless channel based on the electric field intensities of the wireless channels.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention.

DETAILED DESCRIPTION OF THE INVENTION

An embodiment of the present invention will be described in detail below with reference to the drawings. The invention is not limited to the embodiment. Terms of the invention are not limited to those used in the embodiment.

First, the configuration will be described.

Figure 1:
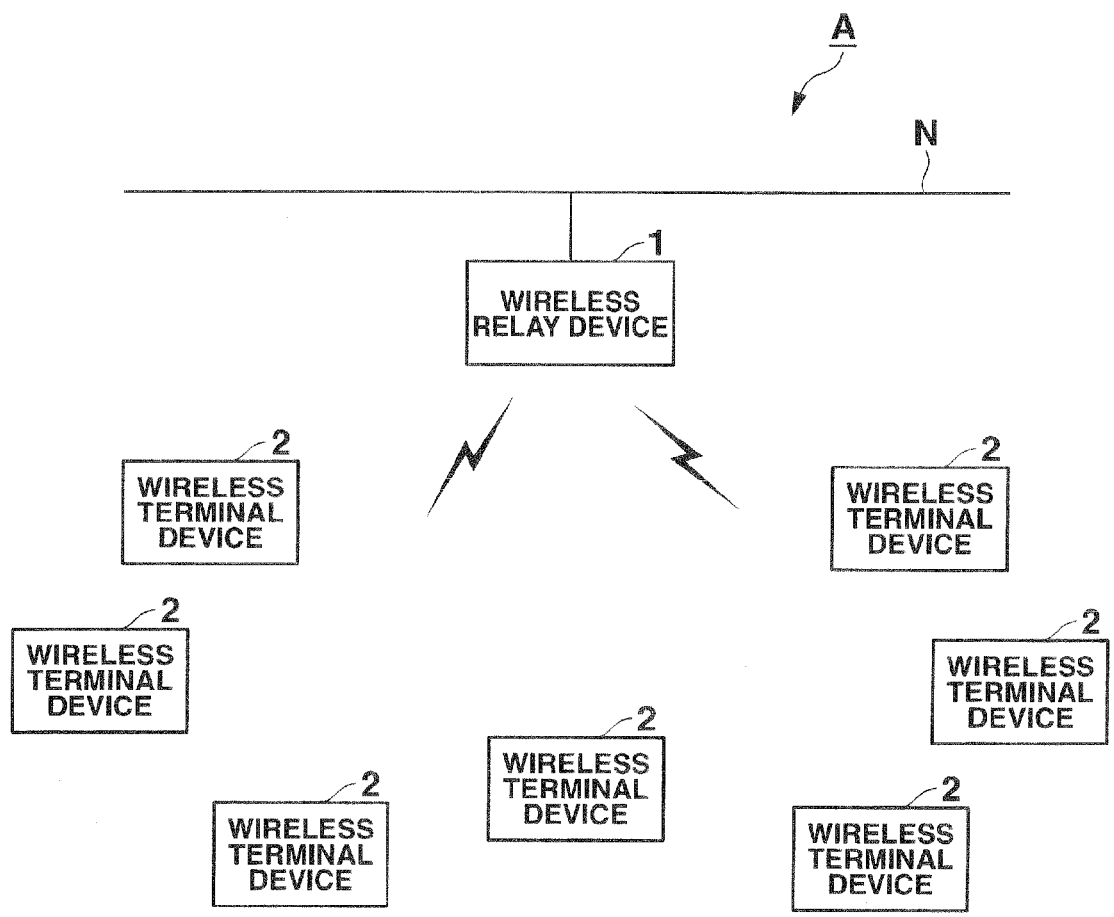
FIG. 1 is a schematic configuration diagram of a wireless communication system according to an embodiment of the invention.

FIG. 1 is a schematic configuration diagram of a wireless communication system A in the embodiment.

As shown in FIG. 1, the wireless communication system A comprises a wireless relay device 1 connected to another wireless relay device or external apparatus via a communication network N, and a plurality of wireless terminal devices 2 connected to the wireless relay device 1 via wireless waves.

In the wireless communication system A, any one of a plurality of wireless channels obtained by dividing a preset frequency band into a plurality of pieces so as not to overlap each other is used, and wireless communication is performed between the wireless relay device 1 and the ratio terminal device 2. For example, a frequency band of 2.4 GHz is divided into a total of 16 channels of channel 11 to channel 26. By using any one of the wireless channels, communication is performed between the wireless relay device 1 and the wireless terminal device 2.

In the following, the wireless relay device 1, the external apparatus, and the wireless terminal device 2 will be also collectively called wireless communication apparatuses.

Figure 2:
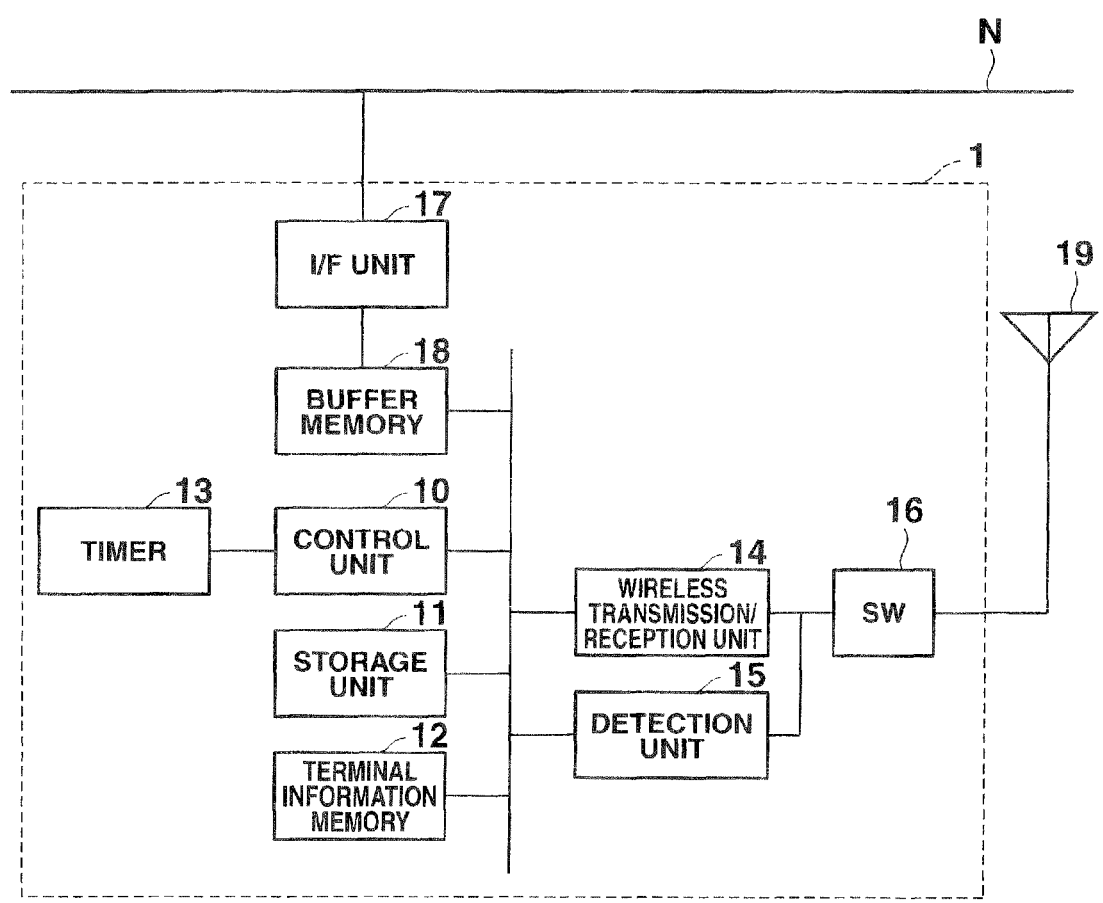
FIG. 2 is a schematic configuration diagram of a wireless relay device according to the embodiment.

FIG. 2 is a schematic configuration diagram of the wireless relay device 1.

As shown in FIG. 2, the wireless relay device 1 comprises a control unit 10, a storage unit 11, a terminal information memory 12, a timer 13, a wireless transmission/reception unit 14, a detection unit 15, a switch unit (SW) 16, an interface (I/F) unit 17, a buffer memory 18, an antenna 19, and the like which are electrically connected to one another.

The control unit 10 comprises a central processing unit (CPU), a read only memory (ROM), a random access memory (RAM), and the like. The control unit 10 reads a designated program, table, or data from various programs, various tables, data, and the like stored in the storage unit 11 and the terminal information memory 12, expands it in a work area in the RAM, the storage unit 11, or the terminal information memory 12, executes various processes in cooperation with the program, stores the process result in a predetermined region in the RAM, the storage unit 11, or the terminal information memory 12, and instructs the units in the wireless relay device 1 to generally control overall operation of the wireless relay device 1.

The control unit 10 selects and determines a wireless channel having low interference wave level and excellent wave condition in the wireless frequency hand which is divided into a plurality of wireless channels as a wireless channel (use channel) to be used in the wireless transmission/reception unit 14 at the time of performing wireless communication with the wireless terminal, device 2. To select the use channel, the control unit 10 periodically executes, by the detection unit 15, energy scanning process of detecting the electric field intensities of the plurality of wireless channels which can be selected. The energy scanning process is executed independently of data transmitting/receiving process executed by the wireless transmission/reception unit 14.

In the energy scanning process of the embodiment, the electric field intensities of the wireless channels except for the wireless channel (use channel) which is used in the wireless transmission/reception unit 14 in the plurality of wireless channels are detected by the detection unit 15. Based on the electric field intensities of the wireless channels detected by the detection unit 15, an estimated value of the electric field intensity of the use channel is calculated.

As processes of calculating the estimated value of the electric field intensity of the use channel in the embodiment, there are a smoothing process and a comparing process. Further, the smoothing process includes three kinds of processes, and the comparing process includes two kinds of processes. Any one of the processes is preset as the process of calculating the estimated value.

In the smoothing process, any of the following first to third smoothing processes is performed in the frequency directions of the wireless channels on the electric fields of the wireless channels whose electric field intensities are detected by the detection unit 15 except for the use channel, and the value calculated by the process becomes the estimated value of the electric field intensity of the use channel.

In the first smoothing process, an average value of the electric field intensities of two wireless channels existing below and above the use channel is calculated. For example, when the use channel is channel 20, the average value of the electric field intensities of channels 19 and 21 is calculated as the estimated value of the electric field intensity of the use channel (channel 20). It is assumed that the smaller the number of a channel, the lower the frequency.

In the second smoothing process, an average value of the electric field intensities of a plurality of preset wireless channels existing below and above the use channel is calculated. For example, when the use channel is channel 20 and the plurality of preset wireless channels are two wireless channels 18 and 19 below the use channel and two wireless channels 21 and 22 above the use channel, the average value of the electric field intensities of channels 18, 19, 21, and 22 is calculated as the estimated value of the electric field intensity of the use channel (channel 20).

In the third smoothing process, a weighted average value of the electric field intensities of a plurality of preset wireless channels below and above the use channel is calculated. For example, when the use channel is channel 20, the plurality of preset wireless channels are two wireless channels 18 and 19 below the use channel and two wireless channels 21 and 22 above the use channel, and each of the electric field intensities of channels 18, 19, 21, and 22 is weighted, the average value of the weighted electric field intensities of channels 18, 19, 21, and 22 is calculated as the estimated value, of the electric field intensity of the use channel (channel 20).

The comparing process includes a first comparing process and a second comparing process.

In the first comparing process, the electric field intensities of two wireless channels below and above the use channel are compared, and the higher electric field intensity of the wireless channel is used as the estimated value of the electric field intensity of the use channel. For example, when the use channel is channel 20, the higher one of the electric field intensities of channels 19 and 21 is used as the estimated value of the electric field intensity of the use channel (channel 20).

In the second comparing process, the highest one of electric field intensities of a plurality of preset wireless channels existing below and above the use channel is calculated as the estimated value of the electric field intensity of a wireless channel used in the wireless transmission/reception unit 14. For example, when the use channel is channel 20 and the plurality of preset wireless channels are two wireless channels 18 and 19 below the use channel and two wireless channels 21 and 22 above the use channel, the highest one of the electric field intensities of channels 18, 19, 21, and 22 is calculated as the estimated value of the electric field intensity of the use channel (channel 20).

The storage unit 11 is an electrically erasable and programmable nonvolatile memory such as a magnetic or optical recording medium or a semiconductor memory, and is fixedly or detachably attached in the wireless relay device 1. In the storage unit 11, programs for processes in the embodiment executed by the control unit 10, various programs, and various tables, data, electric field intensity table, and the like used in the programs are stored.

Each time the energy scanning process is executed, electric field intensities detected for wireless channels except for the use channel and the estimated value of the electric field intensity of the use channel are overwritten in the electric field intensity table.

The terminal information memory 12 is an electrically erasable and programmable memory. In the terminal information memory 12, terminal information such as a node address unique to each of the wireless terminal devices 2 connected to the wireless relay device 1 is stored.

The timer 13 counts the interval of timings (scan interval) of executing the energy scanning process and, for every scan interval, outputs a detection timing signal to the control unit 10.

The wireless transmission/reception unit 14 comprises a modulation circuit and an RF (Wireless Frequency) circuit, adjusts packet transmission power, constructs a packet by encoding data to be transmitted in accordance with an instruction from the control unit 10, modulates the constructed packet, and transmits the packet to the wireless terminal device 2 via the antenna 19. The wireless transmission/reception unit 14 comprises a demodulating circuit and an RF circuit, adjusts packet reception sensitivity, demodulates and decodes the packet received via the antenna 19, and outputs data obtained by analyzing the decoded packet to the control unit 10.

With the wireless transmission/reception unit 14 and the antenna 19, a communication unit is realized which performs wireless communication with the wireless terminal device 2 as a wireless communication apparatus by using any one of a plurality of wireless channels.

The detection unit 15 detects electric field intensity of each of the plurality of wireless channels via the antenna 19.

The SW 16 is provided between the wireless transmission/reception unit 14 and the detection unit 15 and the antenna 19 and switches between the units (the wireless transmission/reception unit 14 and the detection unit 15) to be connected to the antenna 19.

The I/F unit 17 performs communication control for performing communication with the other wireless relay devices 1 or external apparatuses connected via the communication network N by a predetermined communication method.

The buffer memory 18 temporarily stores data received via the I/F unit 17.

The wireless terminal device 2 comprises a control unit, a storage unit, a timer, a wireless transmission/reception unit, a detection unit, a switch unit, an antenna, and the like which are electrically connected, and performs wireless communication with the wireless relay device 1 by using any one of a plurality of wireless channels.

When it is necessary to newly find a wireless channel for performing wireless communication with the wireless relay device 1 in the case where the communication state of the use channel deteriorates, the wireless terminal device 2 of the embodiment executes the energy scanning process like the wireless relay device 1 does.

Since the energy scanning process executed by the wireless terminal device 2 is similar to the energy scanning process executed by the wireless relay device 1, illustration and description thereof will net be provided. Specifically, since the wireless terminal device 2 executes the energy scanning process like the wireless relay device 1 does, the wireless relay device 1 and the wireless terminal device 2 are realized as wireless communication apparatuses.

Next, the operation of the embodiment will be described.

Figure 3:
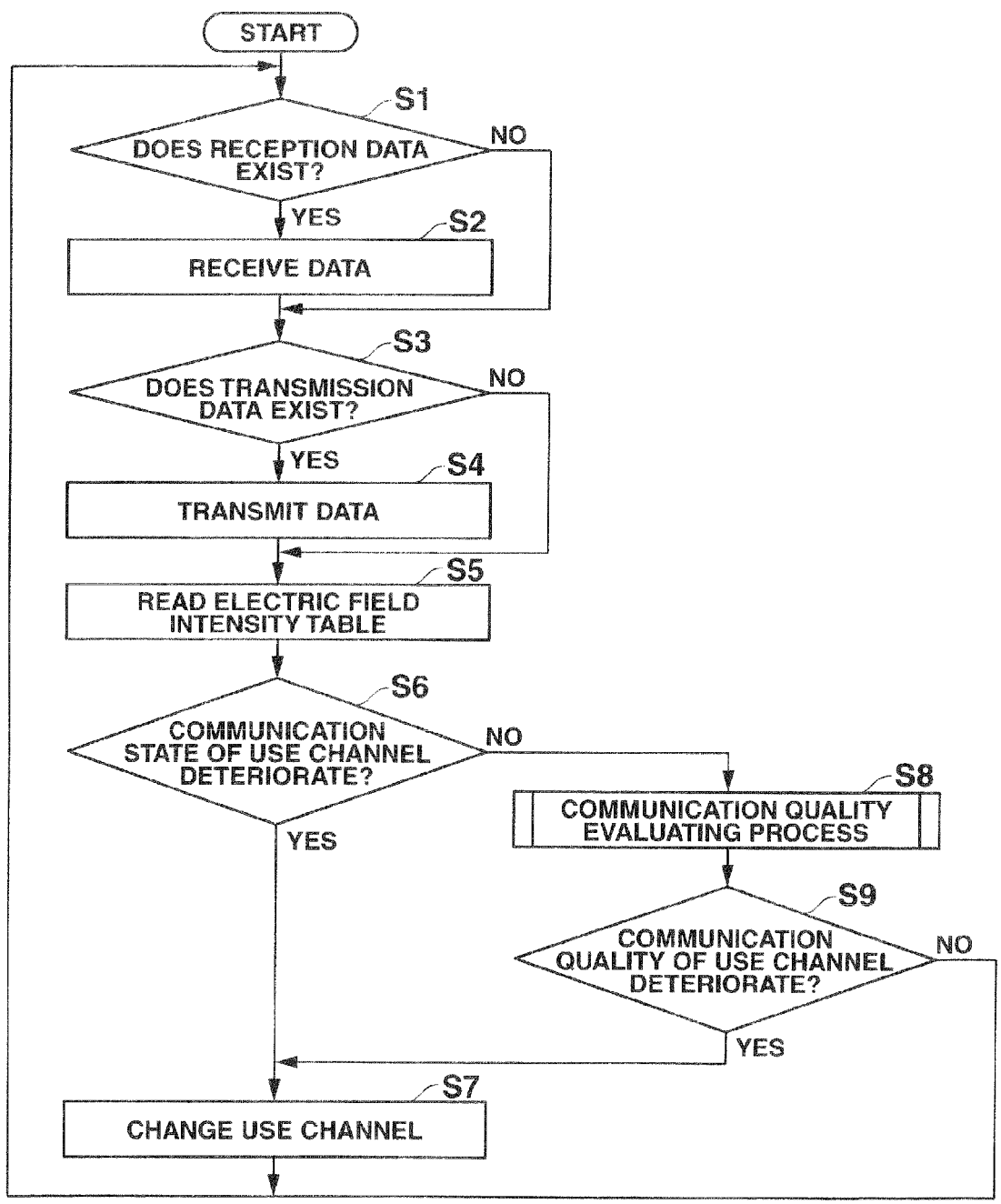
FIG. 3 is a flowchart of data transmitting/receiving process executed in the wireless relay device according to the embodiment.

FIG. 3 is a flowchart of data transmitting/receiving process executed by the wireless relay device 1. The process shown in FIG. 3 is executed in cooperation with the control unit 10 and the other units in the wireless relay device 1 as needed while power is supplied to the wireless relay device 1.

The control unit 10 determines whether there is data to be received by the wireless transmission/reception unit 14 via the antenna 19 or not (step S1). Stated another way, it is determined whether the antenna 19 receives data having a destination address of the wireless relay device 1. In the case where there is no data to be received (NO in step S1), the control unit 10 advances to process in step S3. In the case where there is data to be received (YES in step S1), the control unit 10 executes a process of receiving the data to be received (step S2).

After step S2 or after NO in step S1, the control unit 10 determines whether there is data to be transmitted from the wireless transmission/reception unit 14 or not (step S3). In the case where there is no data to be transmitted (NO in step S3), the control unit 10 advances to the process in step S5. In the case where there is data to be transmitted (YES in step S3), the control unit 10 executes a process of transmitting the data to be transmitted (step S4).

After step S4 or after NO in step S3, the control unit 10 reads an electric field intensity table from the storage unit 11 (step S5) and determines whether the communication state of a wireless channel (use channel) used by the wireless transmission/reception unit 14 for performing wireless communication with the wireless terminal device 2 at present deteriorates or not (step S6).

In step S6, the electric field intensity table is referred to, and it is determined whether the electric field intensity of the use channel is larger than a preset threshold or not. In the case where the electric field intensity of the use channel is larger than the threshold, it is determined that the communication state deteriorates.

In the case where the communication state of the use channel deteriorates (YES in step S6), the control unit 10 changes the use channel to a wireless channel with a good communication state, that is, a wireless channel having relatively low electric field intensity (although a wireless channel having the lowest electric field intensity is preferable, a wireless channel having relatively low electric field intensity (lower than the electric field intensity of the use channel) is sufficient) with reference to the electric field intensity table (step S7) and returns to the process in step S1.

In the case where the communication state of the use channel does not deteriorate (NO in step S6), the control unit 10 executes a communication quality evaluating process (step S8).

In the communication quality evaluating process executed in step S8, it is determined whether the reception rate of an ACK signal or the packet error occurrence rate for data transmitted by using a use channel is equal to or higher than a preset rate or not. Based on the determination result, it is evaluated whether the communication quality of the use channel deteriorates or not.

After step S8, the control unit 10 determines whether the communication quality of the use channel deteriorates or not (step S9). In the case where the communication quality of the use channel deteriorates (YES in step S9), the control unit 10 advances to the process in step S7. In the case where the communication quality of the use channel does not deteriorate (NO in step S9), the control unit 10 advances to the process in step S1.

FIGS. 4 to 8 show flowcharts of the energy scanning process. The processes shown in FIGS. 4 to 8 are executed by cooperation between the control unit 10 and the other units in the wireless relay device 1 as needed while power is supplied to the wireless relay device 1.

Figure 4:
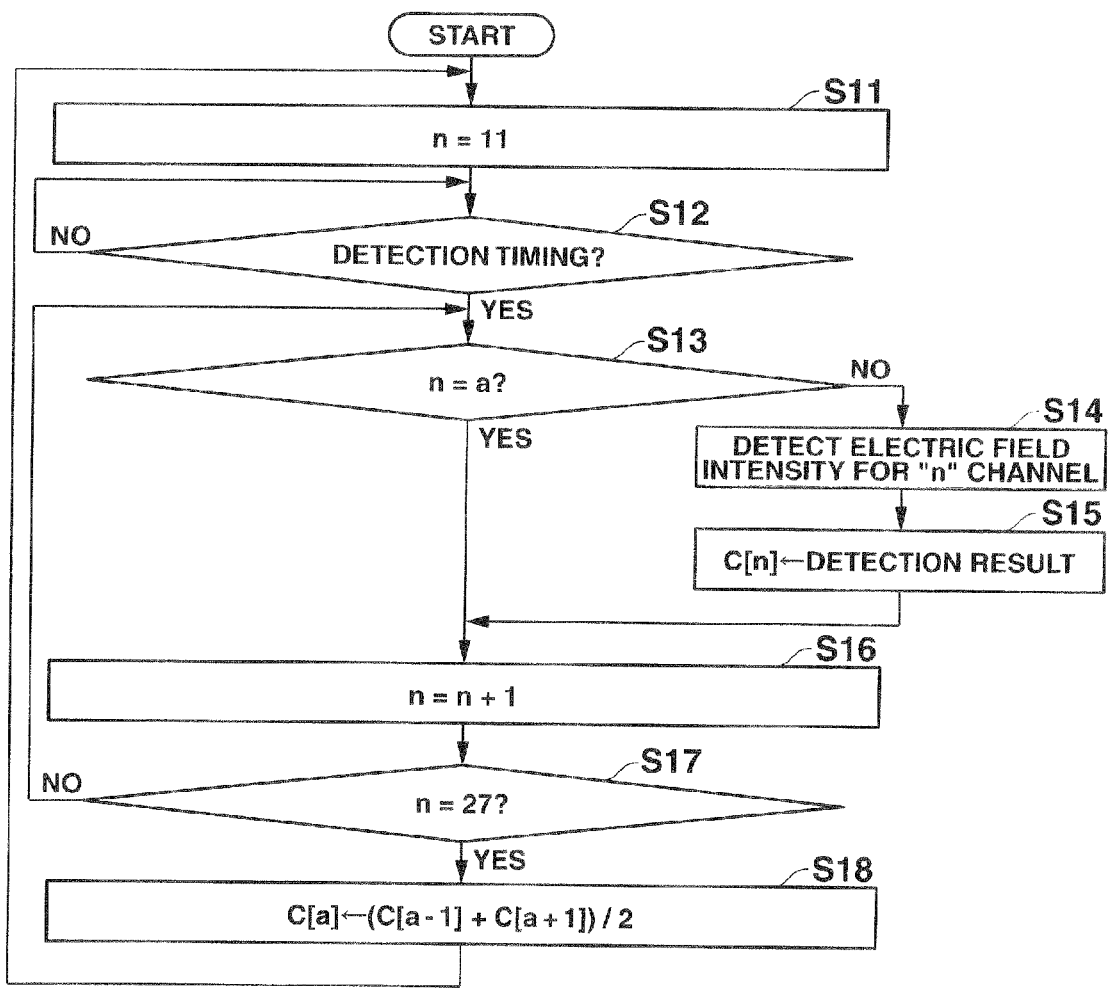
FIG. 4 is a flowchart of energy scanning process using first smoothing process according to the embodiment.

FIG. 4 shows a flowchart of an energy scanning process using the first smoothing process. The control unit 10 sets a variable "n" to 11 (step S11). The variable "n" indicates the channel number of the wireless channel whose electric field intensity is to be detected (a channel to be detected).

The control unit 10 determines whether the detection timing signal is input from the timer 13 or not (step S12). In the case where the detection timing signal is not input (NO in step S12), the control unit 10 returns to the process of step S12.

In the case where the detection timing signal is input (YES in step S12), the control unit 10 determines whether the variable "n" is equal to the channel number "a" of the use channel or not (step S13).

In the case where the variable "n" is not equal to the channel number "a" of the use channel (NO in step S13), the control unit 10 causes the detection unit 15 to detect (scan) the electric field intensity of the wireless channel of the channel number indicated by the variable "n" (step S14), sets the value detected by the detection unit 15 as electric field intensity C[n] of the channel number indicated by the variable "n", and writes the detected value into the electric field intensity table (step S15).

In the case where the variable "n" is equal to the channel number "a" of the use channel (YES in step S13) or after step S15, the control unit 10 sets a new variable "n" by adding 1 to the variable "n" (step S16). The control unit 10 determines whether the value (27 in this case) obtained by adding 1 to the number (26 in this case) of the largest wireless channel among wireless channels which can be set is equal to the variable "n" or not (step S17).

In the case where the value (27 in this case) obtained by adding 1 to the number (26 in this case) of the largest wireless channel among wireless channels which can be set is not equal to the variable "n" (NO in step S17), the control unit 10 returns to the process in step S13.

In the case where the value (27 in this case) obtained by adding 1 to the number (26 in this case) of the largest wireless channel among wireless channels which can be set is equal to the variable "n" (YES in step S17), the control unit 10 executes the first smoothing process, sets the calculated value of the electric field intensity of the use channel "a" as the estimated electric field intensity C[a] of the use channel, writes it in the electric field intensity table (step S18), and returns to the process in step S11.

In the first smoothing process executed in step S18, the electric field intensity C[a] of the use channel "a" is calculated based on electric field intensities C[a−1] and C[a+1] written in the electric field intensity table and the following formula (1).

The electric field intensity C[a−1] is the electric field intensity of the wireless channel a−1 below the use channel. The electric field intensity C[a+1] is the electric field intensity of the wireless channel a+1 above the use channel.

$$C[a]=(C[a-1]+C[a+1])/2 \qquad (1)$$

As described above, by the first smoothing process, without detecting the electric field intensity of the wireless channel (use channel "a") used in the wireless transmission/reception unit 14, the average value of the electric field intensities of two wireless channels below and above the use channel can be obtained as an estimated value of the electric field intensity of the use channel "a".

Figure 5:
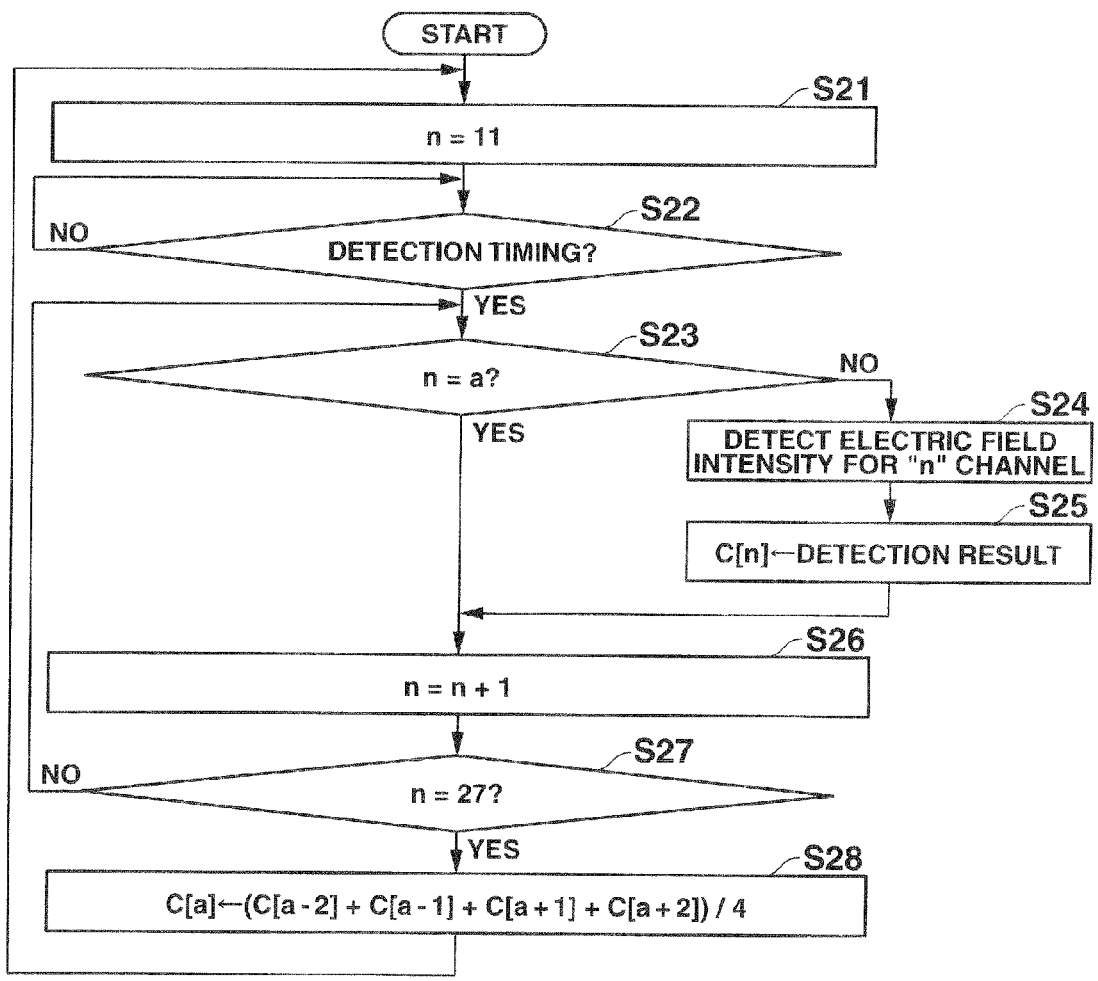
FIG. 5 is a flowchart of energy scanning process using second smoothing process according to the embodiment.

FIG. 5 shows a flowchart of an energy scanning process using the second smoothing process. Since processes in steps S21 to S27 shown in FIG. 5 are similar to those in steps S21 to S17 shown in FIG. 4, the description thereof will not be repeated.

When the value (27 in this case) obtained by adding 1 to the number (26 in this case) of the largest wireless channel among the wireless channels which can be set is equal to the variable "n" (YES in step S27), the control unit 10 executes the second smoothing process, sets the calculated value of the electric field intensity of the use channel "a" as the estimated electric field intensity C[a] of the use channel, writes it in the electric field intensity table (step S28), and returns to the process of step S21.

In the second smoothing process executed in step S28, the electric field intensity C[a] of the use channel "a" is calculated based on electric field intensities C[a−2], C[a−1], C[a+1], and C[a+2] written in the electric field intensity table and the following formula (2).

The electric field intensities C[a−2] and C[a−1] are the electric field intensities of a plurality of (two, in this case) wireless channels a−2 and a−1 below the use channel. The electric field intensities C[a+1] and C[a+2] are the electric field intensities of a plurality of (two, in this case) wireless channels a+1 and a+2 above the use channel.

$$C[a]=(C[a-2]+C[a-1]+C[a+1]+C[a+2])/4 \qquad (2)$$

As describe above, by the second smoothing process, without detecting the electric field intensity of the wireless channel (use channel "a") used in the wireless transmission/reception unit 14, the average value of the electric field intensities of a plurality of preset wireless channels below and above the use channel can be obtained as an estimated value of the electric field intensity of the use channel "a".

Figure 6:
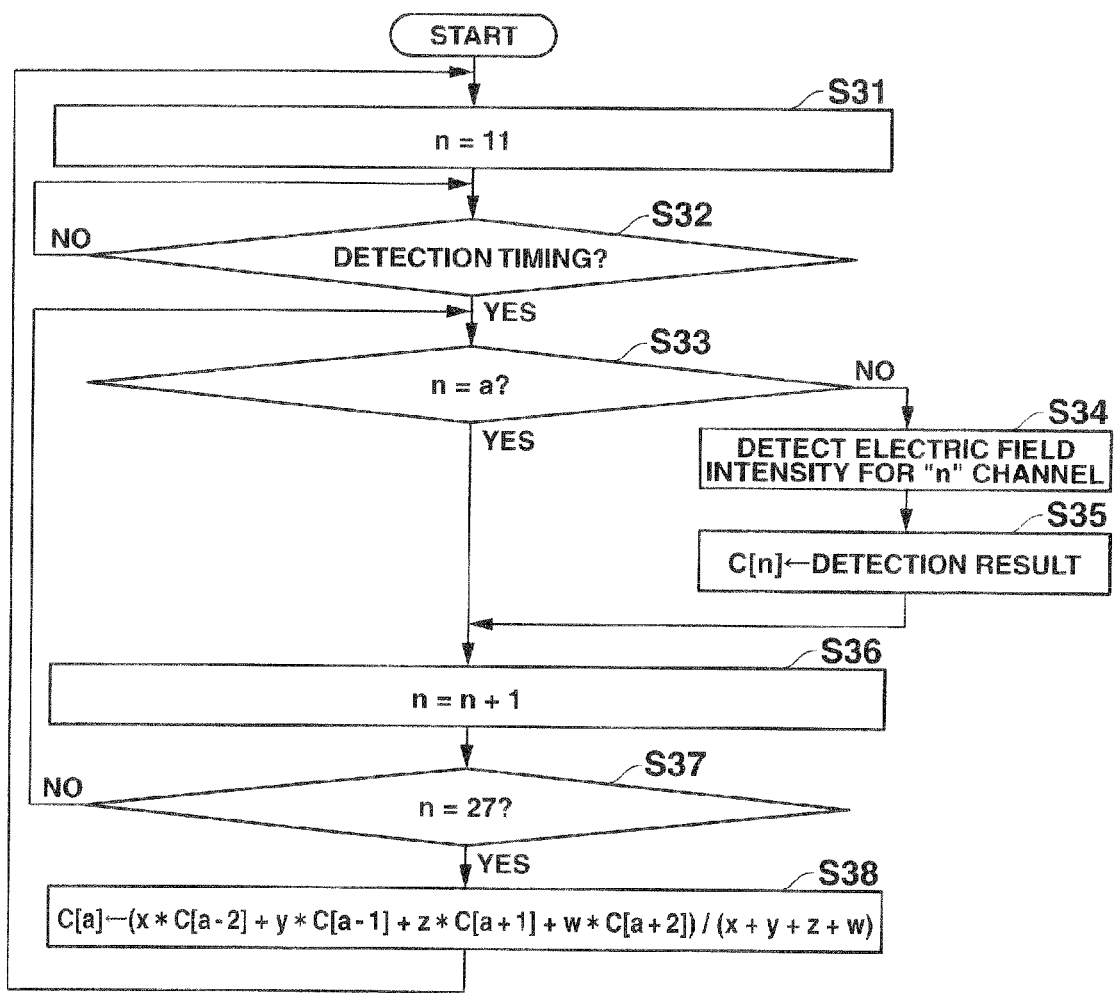
FIG. 6 is a flowchart of energy scanning process using third smoothing process according to an embodiment of the invention.

FIG. 6 shows a flowchart of an energy scanning process in which the third smoothing process is set. Since processes in steps S31 to S37 shown in FIG. 6 are similar to those in steps S11 to S17 shown in FIG. 4, the description thereof will not be repeated.

When the value (27 in this case) obtained by adding 1 to the number (26 in this case) of the largest wireless channel among the wireless channels which can be set is equal to the variable "n" (YES in step S37), the control unit 10 executes the third smoothing process, sets the calculated value of the electric field intensity of the use channel "a" as the estimated electric field intensity C[a] of the use channel, writes it in the electric field intensity table (step S38), and returns to the process of step S31.

In the third smoothing process executed in step S32, the electric field intensity C[a] of the use channel "a" is calculated based on electric field intensities C[a−2], C[a−1], C[a+1], and C[a+2] written in the electric field intensity table, weights x, y, z, and w which are set on the electric field intensities C[a−2], C[a−1], C[a+1], and C[a+2], respectively, and a weighted average calculating formula shown as the following formula (3).

The electric field intensities C[a−2] and C[a−1] are the electric field intensities of a plurality of (two, in this case) wireless channels a−2 and a−1 below the use channel. The electric, field intensities C[a+1] and C[a+2] are the electric field intensities of a plurality of (two, in this case) wireless channels a+1 and a+2 above the use channel.

$$C[a]=(x \times C[a-2]+y \times C[a-1]+z \times C[a+1]+w \times C[a+2])/(x+y+z+w) \quad (3)$$

The weights w, y, z, and w may be weights which increase toward the use channel, or weights which are set according to the electric field intensities of the wireless channels.

As described above, by the third smoothing process, without detecting the electric field intensity of the wireless channel (use channel "a") used in the wireless transmission/reception unit 14, the weighted average value of the electric field intensities of a plurality of preset wireless channels below and above the use channel can be obtained as an estimated value of the electric field intensity of the use channel.

Therefore, by the first to third smoothing processes, the value calculated by performing the smoothing processes in the frequency direction on the electric field intensity of the wireless channel whose electric field intensity is detected by the detection unit 15 can be obtained as the estimated value of the electric field intensity of the use channel.

Figure 7:
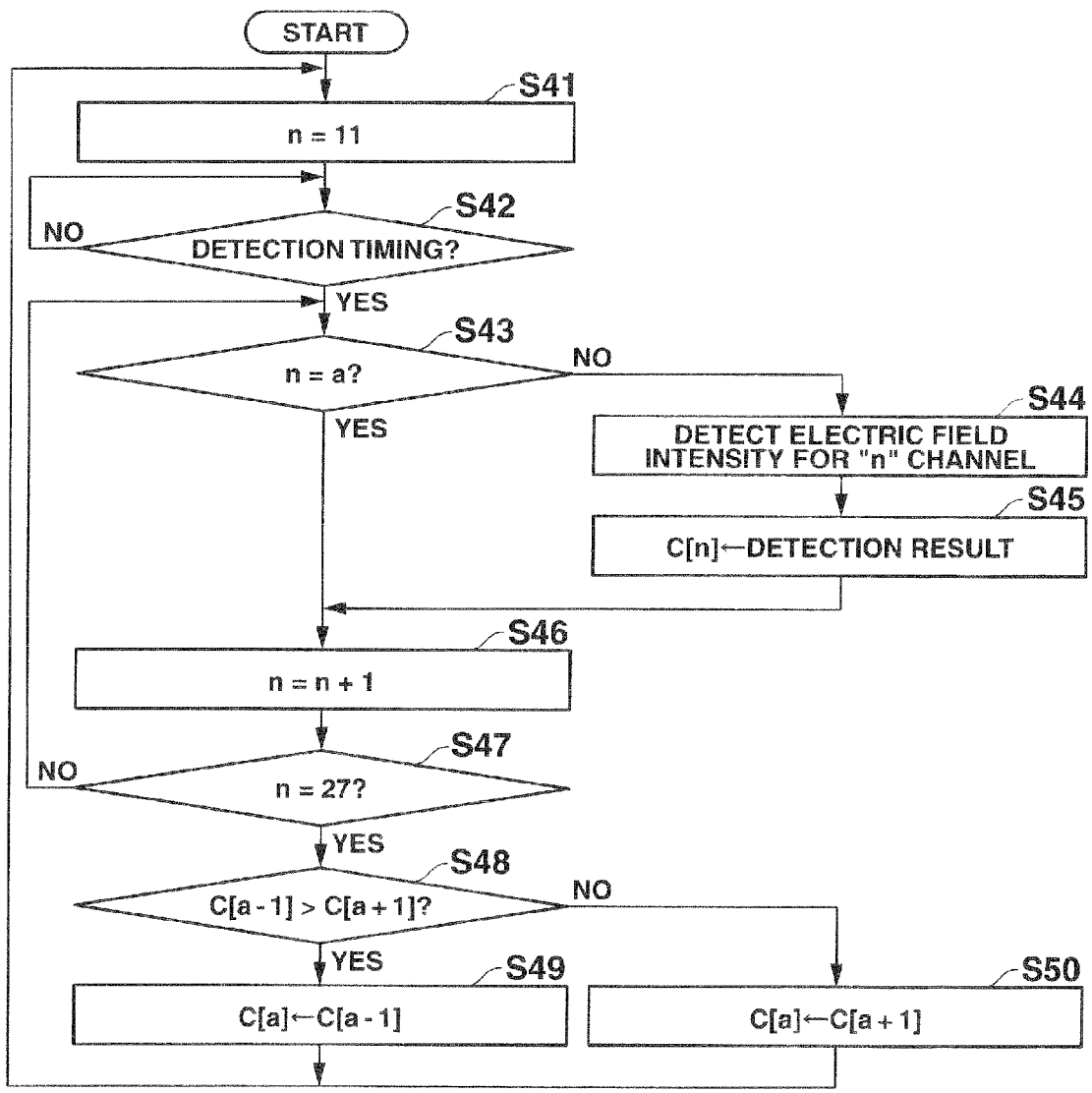
FIG. 7 is a flowchart of energy scanning process using first comparing process according to an embodiment of the invention.

FIG. 7 shows a flowchart of an energy scanning process using the first comparing process. Since the processes in steps S41 to S47 shown in FIG. 7 are similar to those of steps S11 to S17 shown in FIG. 4, the description thereof will not be repeated.

In the case where the value (27 in this case) obtained by adding 1 to the number (26 in this case) of the largest wireless channel among wireless channels which can be set is equal to the variable "a" (YES in step S47), the control unit 10 executes the first comparing process (step S48), sets the comparison result as the estimated electric field intensity C[a] of the use channel, writes it in the electric field intensity table (step S49 or S50), and returns to the process in step S41.

In the first comparing process executed in step S48, the electric field intensities C[a−1] and C[a+1] written in the electric field intensity table are compared with each other to determine whether the electric field intensity C[a−1] is higher than the electric field intensity C[a+1] or not.

The electric field intensity C[a−1] is the electric field intensity of the wireless channel a−1 below the use channel. The electric field intensity C[a+1] is the electric field intensity of the wireless channel a+1 above the use channel.

When the electric field intensity C[a−1] is higher than the electric field intensity C[a+1] (YES in step S48), the electric field intensity C[a−1] is set as the estimated value of the electric field intensity of the use channel "a", and the set value is written as the electric field intensity C[a] of the use channel "a" into the electric field intensity table (step S49).

When the electric field intensity C[a−1] is equal to or lower than the electric field intensity C[a+1] (NO in step S48), the electric field intensity C[a+1] is set as the estimated value of the electric field intensity of the use channel "a", and the set value is written as the electric field intensity C[a] of the use channel into the electric field intensity table (step S50).

As described above, by the first comparing process, without detecting the electric field intensity of the wireless channel (use channel "a") used in the wireless transmission/reception unit 14, the higher one of the electric field intensities of two wireless channels below and above the use channel can be set as an estimated value of the electric field intensity of the use channel "a".

Figure 8:
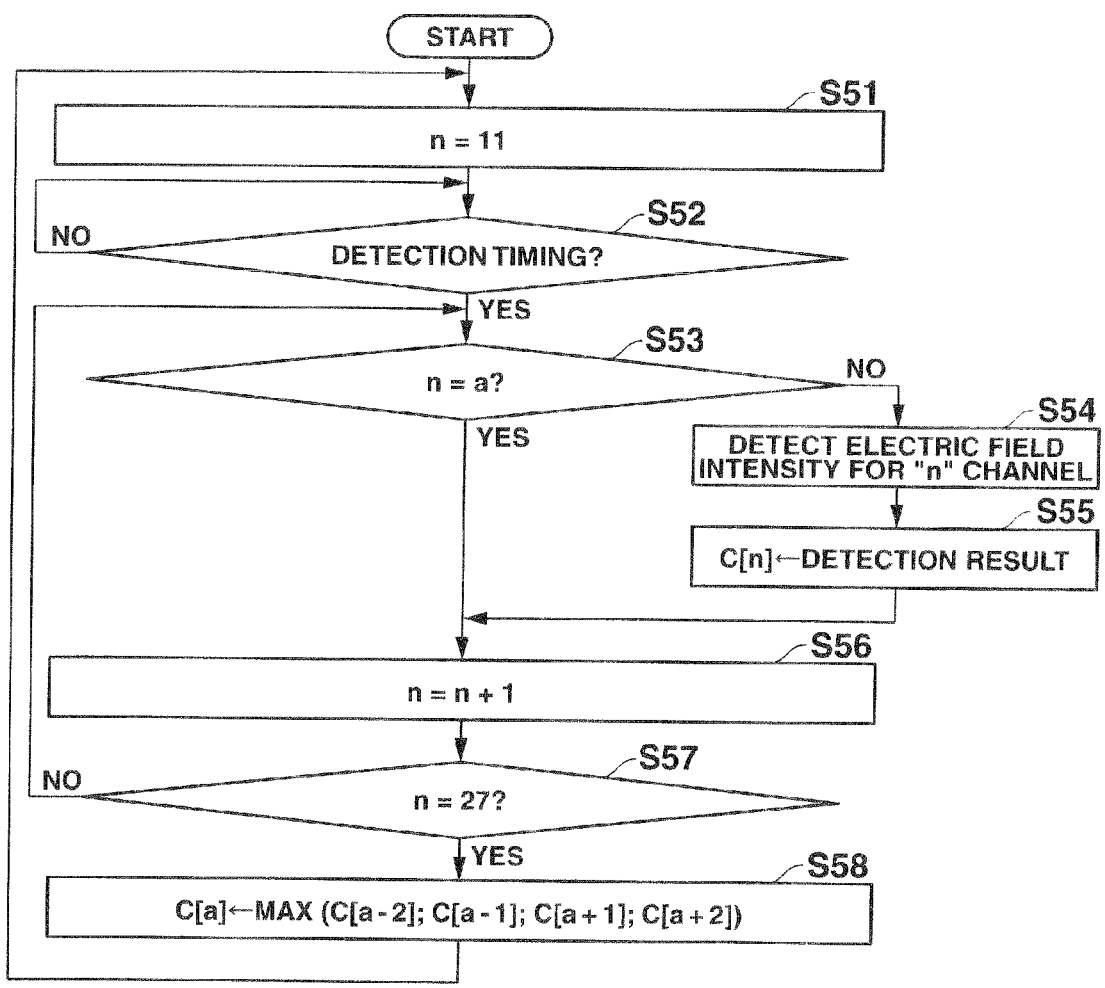
FIG. 8 is a flowchart of energy scanning process using second comparing process according to an embodiment of the invention.

FIG. 8 shows a flowchart of an energy scanning process in which the second comparing process is set. Since the processes in steps S51 to S57 shown in FIG. 8 are similar to those of steps S11 to S17 shown in FIG. 4, the description thereof will not be repeated.

In the case where the value (27 in this case) obtained by adding 1 to the number (26 in this case) of the largest wireless channel among wireless channels which can be set is equal to the variable "n" (YES in step S57), the control unit 10 executes the second comparing process, sets the comparison result "a" as the estimated electric field intensity C[a] of the use channel, writes it in the electric field intensity table (step S58), and returns to the process in step S51.

In the second comparing process executed in step S58, the electric field intensities C[a−2], C[a−1], C[a+1], and C[a+2] written in the electric field intensity table are compared with each other to select the highest electric field intensity. The selected electric field intensity is set as the estimated value of the electric field intensity of the use channel "a", and the set value is written as the electric field intensity C[a] of the use channel "a" into the electric field intensity table.

The electric field intensities C[a−2] and C[a−1] are electric field intensities of two wireless channels a−2 and a−1 below the use channel. The electric field intensities C[a+1] and C[a+2] are electric field intensities of two wireless channels a+1 and a+2 above the use channel.

As described above, by the second comparing process, without detecting the electric field intensity of the wireless channel (use channel "a") used in the wireless transmission/reception unit 14, the highest one of the electric field intensities of a plurality of preset wireless channels below and above the use channel can be obtained as an estimated value of the electric field intensity of the use channel "a".

Although the example of using a total of four wireless channels of two wireless channels and two wireless channels below and above the use channel as the plurality of preset wireless channels has been described in the embodiment, the present invention is not limited to the example. For example, three or more wireless channels below and above the use channel may be used. Although the number of wireless channels below the use channel and that of wireless channels above the use channel are the same, the invention is not limited to the case.

As described above, according to the embodiment, the estimated value of the electric field intensity of the use channel can be obtained based on the electric field intensities of the wireless channels except for the wireless, channel use channel) used in the wireless transmission/reception unit 14. Consequently, even during execution of the data transmitting/receiving process in the wireless transmission/reception unit 14, without detecting the electric field intensity of the use channel, the estimated value of the electric field intensity of the wireless channel can be obtained.

Therefore, based on the estimated value of the electric field intensity of the use channel, the communication state of the use channel can be grasped. Before the communication quality of the use channel deteriorates, by changing the use channel to a wireless channel of good communication quality, the communication environment of the data transmitting/receiving process in the wireless transmission/reception unit 14 can be maintained excellent.

That is, according to the embodiment, the wireless communication apparatus and the wireless communication method capable of grasping the electric field intensity of a wireless channel without detecting the electric field intensity of the wireless channel being used can be provided.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. A wireless communication apparatus comprising:
    a communication unit configured to wirelessly communicate with another wireless communication apparatus using a selected one of a plurality of wireless channels obtained by dividing a predetermined frequency band;
    a detection unit configured to detect an electric field intensity of a wireless channel; and
    a control unit configured to detect electric field intensities of a plurality of only non-selected wireless channels using the detection unit and not to detect an electric field intensity of the selected one of the wireless channels using the detection unit, and configured to calculate an estimated value of the electric field intensity of the selected one of the wireless channels used by the communication unit based on the electric field intensities of only the non-selected wireless channels detected by the detection unit;
    wherein the control unit is configured to calculate an average value of electric field intensities of a predetermined number of wireless channels below and above the wireless channel used by the communication unit and to set the average value as the estimated value of the electric field intensity of the wireless channel used by the communication unit.

2. The wireless communication apparatus according to claim 1, wherein the control unit is configured to change the wireless channel used by the communication unit to another wireless channel having an electric field intensity detected by the detection unit or an estimated value of the electric field intensity calculated by the control unit which is relatively low when a communication state of the wireless channel used by the communication unit deteriorates.

3. The wireless communication apparatus according to claim 1, wherein the control unit is configured to calculate the average value as a weighted average value of the electric field intensities of the predetermined number of wireless channels below and above the wireless channel used by the communication unit.

4. A wireless communication method for a wireless communication apparatus comprising a communication unit configured to wirelessly communicate with another wireless communication apparatus using a selected one of a plurality of wireless channels obtained by dividing a predetermined frequency band, and a detection unit configured to detect an electric field intensity of a wireless channel, the method comprising:
    detecting electric field intensities of a plurality of only non-selected wireless channels using the detection unit, and not detecting an electric field intensity of the selected one of the wireless channels using the detection unit; and
    calculating an estimated value of the electric field intensity of the selected one of the wireless channels used by the communication unit based on the electric field intensities of only the non-selected wireless channels detected by the detection unit;
    wherein the calculating comprises calculating an average value of electric field intensities of a predetermined number of wireless channels below and above the wireless channel used by the communication unit and setting the average value as the estimated value of the electric field intensity of the wireless channel used by the communication unit.

5. The wireless communication method according to claim 4, further comprising changing the wireless channel used by the communication unit to another wireless channel having an electric field intensity detected by the detection unit or an estimated value of the electric field intensity calculated by the control unit which is relatively low when a communication state of the wireless channel used by the communication unit deteriorates.

6. The wireless communication method according to claim 4, wherein the average value is calculated as a weighted average value of the electric field intensities of the predetermined number of wireless channels below and above the wireless channel used by the communication unit.

* * * * *